United States Patent
Son et al.

(10) Patent No.: US 12,512,491 B2
(45) Date of Patent: Dec. 30, 2025

(54) FUEL CELL OPERATING SYSTEM AND METHOD OF CONTROLLING OPERATION OF FUEL CELL

(71) Applicants: HYUNDAI MOTOR COMPANY, Seoul (KR); KIA CORPORATION, Seoul (KR)

(72) Inventors: Ik Jae Son, Suwon-si (KR); Yei Sik Jeon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 4 days.

(21) Appl. No.: 17/748,765

(22) Filed: May 19, 2022

(65) Prior Publication Data

US 2023/0030879 A1    Feb. 2, 2023

(30) Foreign Application Priority Data

Jul. 27, 2021    (KR) ........................ 10-2021-0098623

(51) Int. Cl.
     *H01M 8/04111*      (2016.01)
     *H01M 8/04089*      (2016.01)

(52) U.S. Cl.
     CPC .... *H01M 8/04111* (2013.01); *H01M 8/04097* (2013.01)

(58) Field of Classification Search
     CPC ......... H01M 8/04111; H01M 8/04097; H01M 8/04552
     See application file for complete search history.

(56) References Cited

U.S. PATENT DOCUMENTS

| 8,577,461 | B2 | 11/2013 | Vaska | |
|---|---|---|---|---|
| 2017/0346117 | A1* | 11/2017 | Ojima | ............... H01M 8/04228 |
| 2018/0166719 | A1* | 6/2018 | Kwon | ............... H01M 8/04529 |

(Continued)

FOREIGN PATENT DOCUMENTS

KR      2006-0118128 A      11/2006

OTHER PUBLICATIONS

Xiaoping Wang, et al., "Effect of Voltage on Platinum Dissolution: Relevance to Polymer Electrolyte Fuel Cells," Electrochemical and Solid State Letters, 9 (5) A225 A227 (2006).

(Continued)

*Primary Examiner* — Milton I Cano
*Assistant Examiner* — Albert Michael Hilton
(74) *Attorney, Agent, or Firm* — MCDONNELL BOEHNEN HULBERT & BERGHOFF LLP (57) ABSTRACT

A fuel cell operating system including an air compressor disposed on an air supply line and configured to compress an oxidation gas to be supplied to a fuel cell stack and supply the compressed air to a fuel cell inlet side, an air discharge line configured to discharge the oxidation gas from the fuel cell stack, a bypass line configured to branch off from the air discharge line through a valve, connected to the air supply line, and configured to resupply the discharged oxidation gas to the fuel cell inlet side, and a control unit configured to control a flow rate of the oxidation gas to be supplied to the fuel cell stack by controlling the valve on the bypass line depending on a cell ratio value which is a ratio of the fuel cells each being applied with a voltage lower than a first voltage among the fuel cells.

9 Claims, 6 Drawing Sheets

(56) References Cited

U.S. PATENT DOCUMENTS

2019/0198900 A1* 6/2019 Ohashi ............... H01M 8/0435
2020/0266468 A1* 8/2020 Chang ............... H01M 8/04395

OTHER PUBLICATIONS

Minoru Inaba, et al., "Gas crossover and membrane degradation in polymer electrolyte fuel cells," Electrochimica Acta 51 (2006) 5746-5753.

Adam Z. Weber, et al. "A Critical Review of Modeling Transport Phenomena in Polymer Electrolyte Fuel Cells," Journal of The Electrochemical Society 161 (12) F1254-F1299 (2014).

* cited by examiner

FUEL CELL OPERATING SYSTEM AND METHOD OF CONTROLLING OPERATION OF FUEL CELL

CROSS REFERENCE TO RELATED APPLICATIONS

The present application claims priority of Korean Patent Application No. 10-2021-0098623 filed on Jul. 27, 2021, the entire contents of which is incorporated herein for all purposes by this reference.

BACKGROUND

Field of the Disclosure

The present disclosure relates to a fuel cell operating system and a method of controlling an operation of a fuel cell, which utilizes exhaust gas, discharged after a reaction, to perform low flow rate control for controlling an upper voltage limit or an upper current limit when managing a fuel cell system, improve water discharge performance of a fuel cell and a voltage deviation between the fuel cells by recirculating exhaust gas in a stepwise manner, stabilize operational performance of the fuel cell, and further minimize a deterioration in durability.

Description of the Related Art

A deterioration in durability of a fuel cell stack occurs and accelerates as the time for which the fuel cell stack is exposed to a high voltage and a high temperature increases during an operation of the fuel cell system. The deterioration in durability of the fuel cell stack occurs as a catalyst such as platinum contained in an electrode at an air supply side is chemically melted through oxidation and reduction reactions and thus a reaction area of the electrode decreases. Therefore, a technology for restricting voltage or current has been applied to the fuel cell system to minimize the time for which the fuel cell stack is exposed to the high voltage. A technology for restricting an air supply amount in conjunction with the restriction of the voltage and/or current has also been applied to the fuel cell system.

However, the air supply amount may excessively decrease when the technology for restricting the amount of air supplied to the fuel cell is applied without considering a state of a fuel cell and a state of the system operated by the fuel cell. In this case, produced water created by a hydrogen-oxygen reaction in the fuel cell cannot be smoothly discharged, which causes back-diffusion of hydrogen at a hydrogen side. For this reason, the hydrogen cannot be smoothly supplied, which degrades an electrode at the hydrogen side. Therefore, in the present technical field, it is necessary to solve the above-mentioned problems.

The foregoing explained as the background is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to provide a fuel cell operating system and a method of controlling an operation of a fuel cell, which utilize exhaust gas, discharged after a reaction, to perform low flow rate control for controlling an upper voltage limit or an upper current limit when managing a fuel cell system, improve water discharge performance of a fuel cell and a voltage deviation between the fuel cells by recirculating exhaust gas in a stepwise manner, stabilize operational performance of the fuel cell, and further minimize a deterioration in durability.

According to one aspect, there is provided a fuel cell operating system including an air compressor disposed on an air supply line and configured to compress an oxidation gas to be supplied to a fuel cell stack and supply the compressed air to a fuel cell inlet side, an air discharge line configured to discharge the oxidation gas from the fuel cell stack, a bypass line configured to branch off from the air discharge line through a valve, connected to the air supply line, and configured to resupply the discharged oxidation gas to the fuel cell inlet side, and a control unit configured to control a flow rate of the oxidation gas to be supplied to the fuel cell stack by controlling the valve on the bypass line depending on a cell ratio value which is a ratio of the fuel cells each being applied with a voltage lower than a first voltage among the fuel cells.

The bypass line may further include a recirculation blower configured to compress the oxidation gas to be resupplied to the fuel cell inlet side.

The cell ratio value may include a first ratio and a second ratio smaller than the first ratio, the control unit may control the valve on the bypass line to resupply the discharged oxidation gas to the fuel cell inlet side when the cell ratio value is equal to or larger than the first ratio, and the control unit may control the valve on the bypass line to supply the discharged oxidation gas to the air discharge line when the cell ratio value is smaller than the first ratio and equal to or larger than the second ratio.

The air supply line may further include an air adjuster configured to adjust the supply amount of oxidation gas to be supplied to the fuel cell stack, and the control unit may control an operation of the air adjuster at a low flow rate depending on an average voltage when the cell ratio value is equal to or larger than the first ratio and controls the operation of the air adjuster at a low flow rate depending on an average current when the cell ratio value is smaller than the first ratio.

The control unit may control the valve on the bypass line depending on an operating temperature of the fuel cell and the cell ratio value which is a ratio of the fuel cells each being applied with a voltage lower than the first voltage among the fuel cells.

The control unit may control the valve on the bypass line to resupply the discharged oxidation gas to the fuel cell inlet side when the cell ratio value is equal to or larger than a first ratio and an operating temperature of the fuel cell is lower than a first temperature, and the control unit may control the valve on the bypass line to supply the discharged oxidation gas to the air discharge line when the cell ratio value is equal to or larger than the first ratio and the operating temperature of the fuel cell is equal to or higher than the first temperature or when the cell ratio value is smaller than the first ratio.

The air compressor may operate for a predetermined time after the valve on the bypass line is controlled to resupply the discharged oxidation gas to the fuel cell inlet side.

The first voltage may decrease in conjunction with an increase in a parameter which is accumulated as the fuel cell is used.

The parameter may be the first ratio.

According to another aspect, there is provided a method of controlling an operation of a fuel cell, the method including controlling, by a control unit, a flow rate of an oxidation gas to be supplied to a fuel cell stack by controlling a valve on a bypass line configured to resupply the oxidation gas, which is to be supplied to the fuel cell stack, to a fuel cell inlet side depending on a cell ratio value which is a ratio of the fuel cells each being applied with a voltage lower than a first voltage among the fuel cells.

The controlling of the flow rate may further include compressing the oxidation gas to be resupplied to the fuel cell inlet side by means of a recirculation blower when the valve on the bypass line is controlled.

In the controlling of the flow rate, the cell ratio value may include a first ratio value and a second ratio value smaller than the first ratio value, the control unit may control the valve on the bypass line to resupply the discharged oxidation gas to the fuel cell inlet side when the cell ratio value is equal to or larger than the first ratio value, and the control unit may control the valve on the bypass line to supply the discharged oxidation gas to an air discharge line when the cell ratio value is smaller than the first ratio value and equal to or larger than the second ratio value.

In the controlling of the flow rate, the control unit may control an operation of an air adjuster, which is included in an air supply line and configured to adjust the supply amount of the oxidation gas to be supplied to the fuel cell stack, depending on an average voltage when the cell ratio value is equal to or larger than a first ratio value, and the control unit may control the operation of the air adjuster depending on an average current when the cell ratio value is smaller than the first ratio value.

In the controlling of the flow rate, the control unit may control the valve on the bypass line depending on an operating temperature of the fuel cell and a cell ratio value which is a ratio of the fuel cells each being applied with a voltage lower than the first voltage among the fuel cells.

In the controlling of the operation, the control unit may control the valve on the bypass line to resupply the discharged oxidation gas to the fuel cell inlet side when the cell ratio value is equal to or larger than a first ratio and an operating temperature of the fuel cell is lower than a first temperature, and the control unit may control the valve on the bypass line to supply the discharged oxidation gas to an air discharge line when the cell ratio value is equal to or larger than a first ratio value and the operating temperature of the fuel cell is equal to or higher than the first temperature or when the cell ratio value is smaller than the first ratio value.

According to the fuel cell operating system and the method of controlling the operation of the fuel cell according to the present disclosure, it is possible to utilize exhaust gas, discharged after a reaction, to perform low flow rate control for controlling an upper voltage limit or an upper current limit when managing a fuel cell system, improve water discharge performance of a fuel cell and a voltage deviation between the fuel cells by recirculating exhaust gas in a stepwise manner, stabilize operational performance of the fuel cell, and further minimize a deterioration in durability.

DETAILED DESCRIPTION

Specific structural or functional descriptions of exemplary embodiments of the present disclosure disclosed in this specification or application are exemplified only for the purpose of explaining the exemplary embodiments according to the present disclosure, the exemplary embodiments according to the present disclosure may be carried out in various forms, and it should not be interpreted that the present disclosure is limited to the exemplary embodiments described in this specification or application. Hereinafter, embodiments of the present disclosure will be described in detail with reference to the accompanying drawings.

Figure 1:
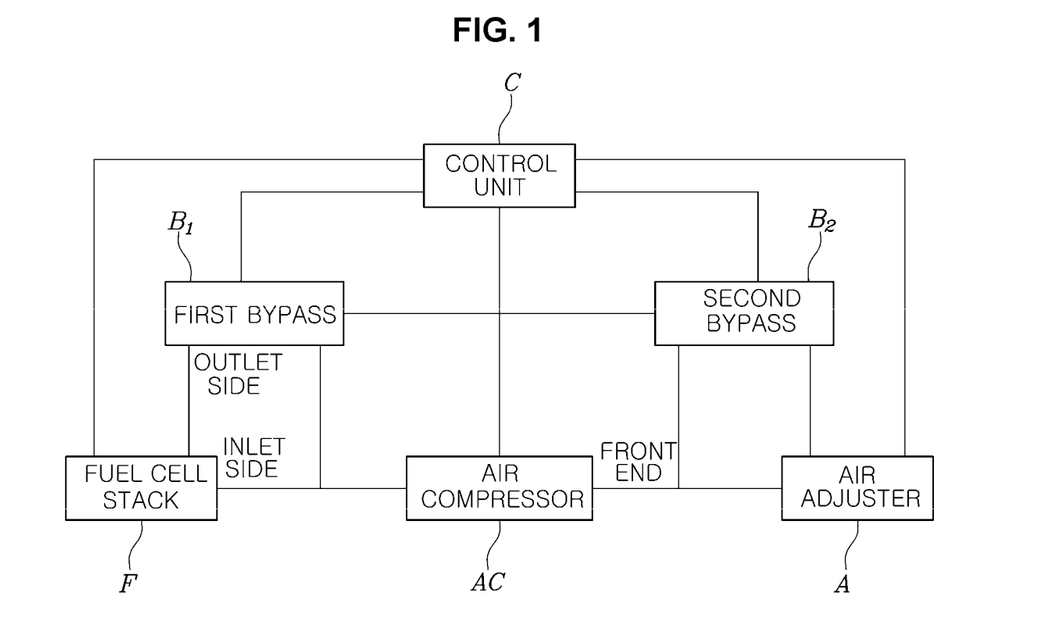
FIGS. 1, 2, and 3 are configuration views a fuel cell operating system according to an embodiment of the present disclosure.
Figure 2:
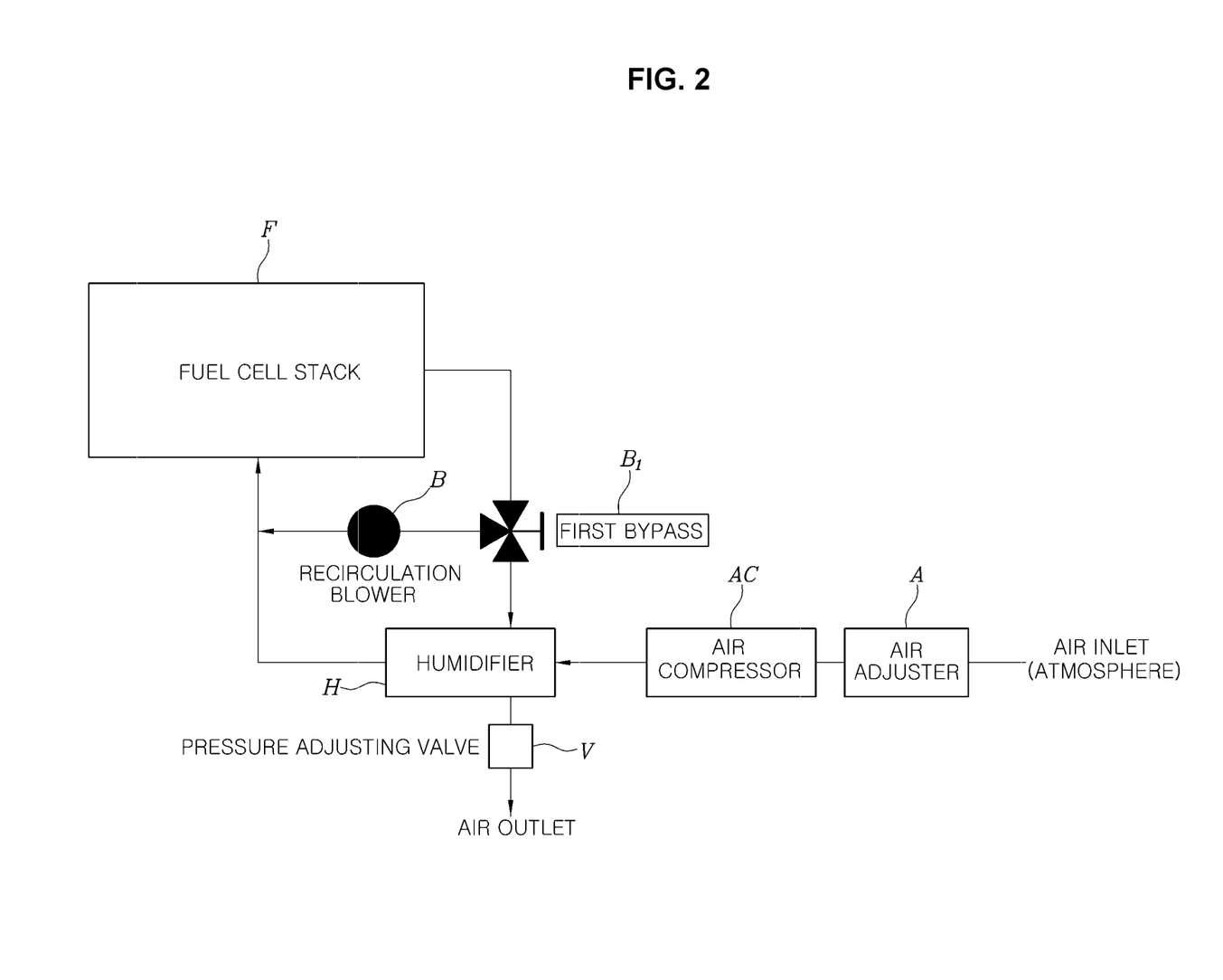
Figure 3:
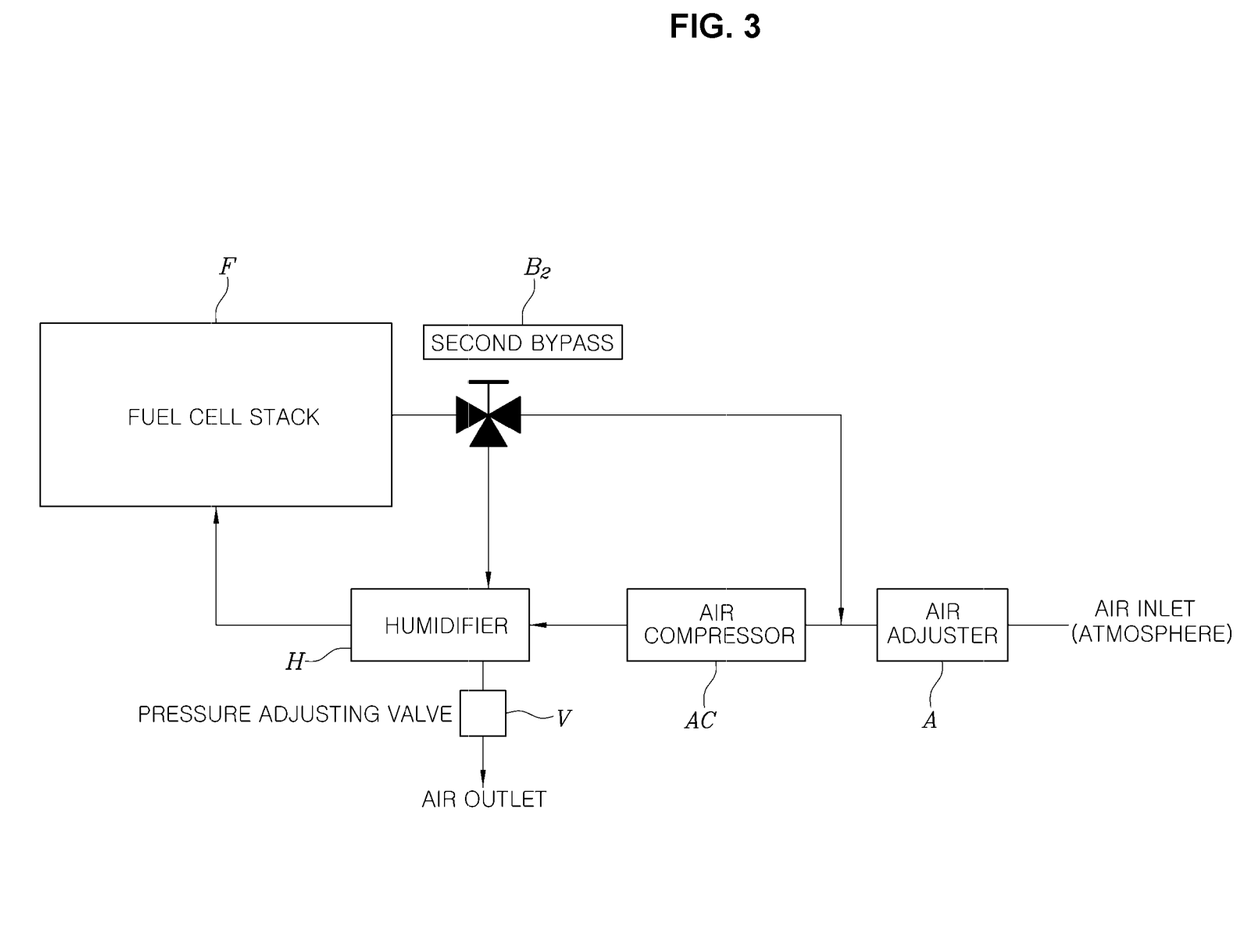
Figure 4:
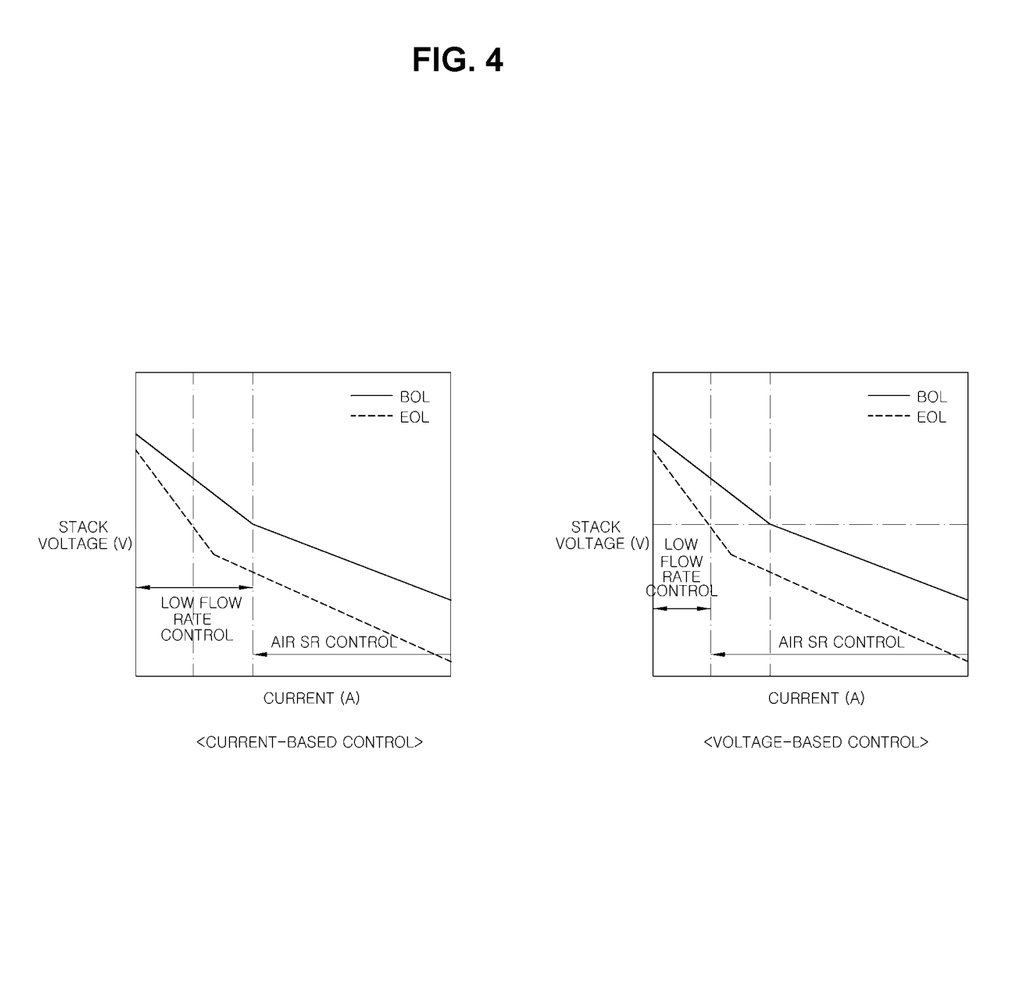
FIG. 4 is a graph illustrating a mechanism of the fuel cell operating system according to the embodiment of the present disclosure.
Figure 5:
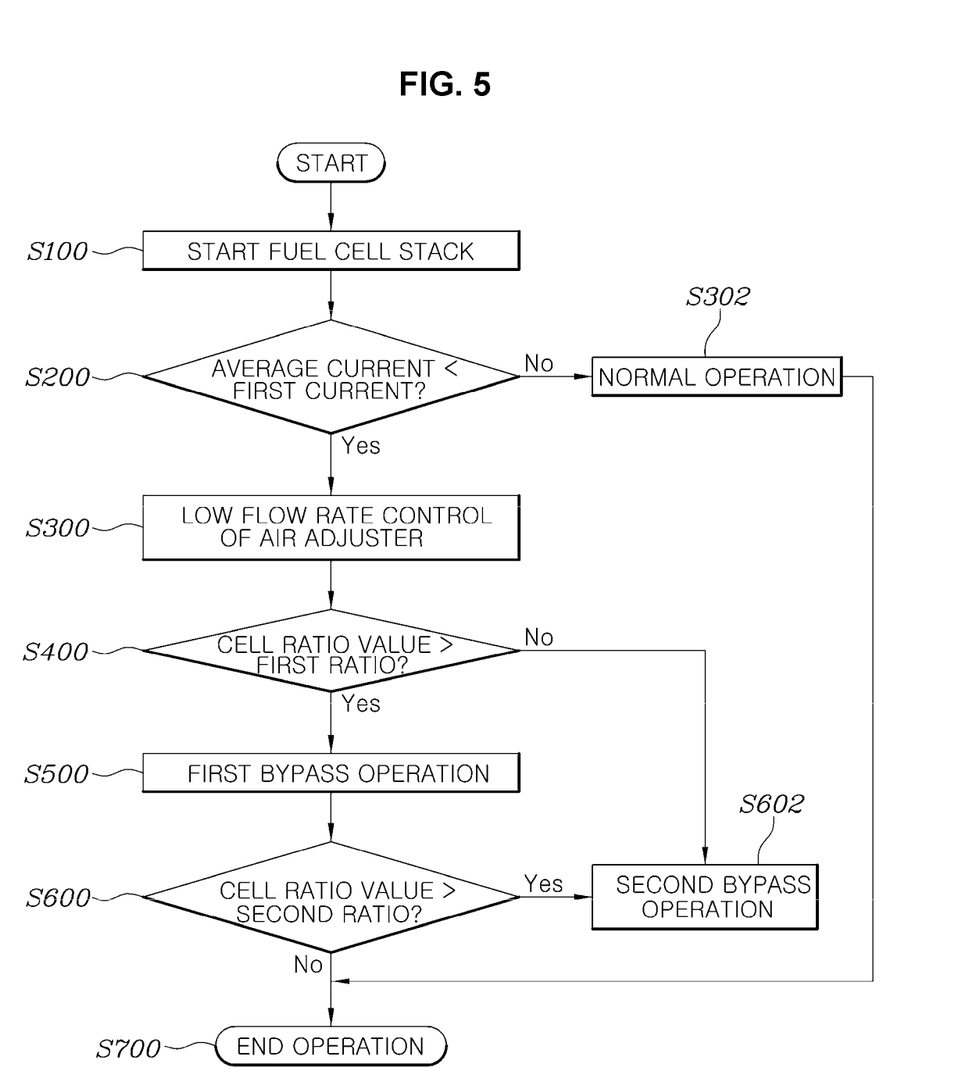
FIGS. 5 and 6 are flowcharts illustrating an application of a method of controlling an operation of a fuel cell according to another embodiment of the present disclosure.
Figure 6:
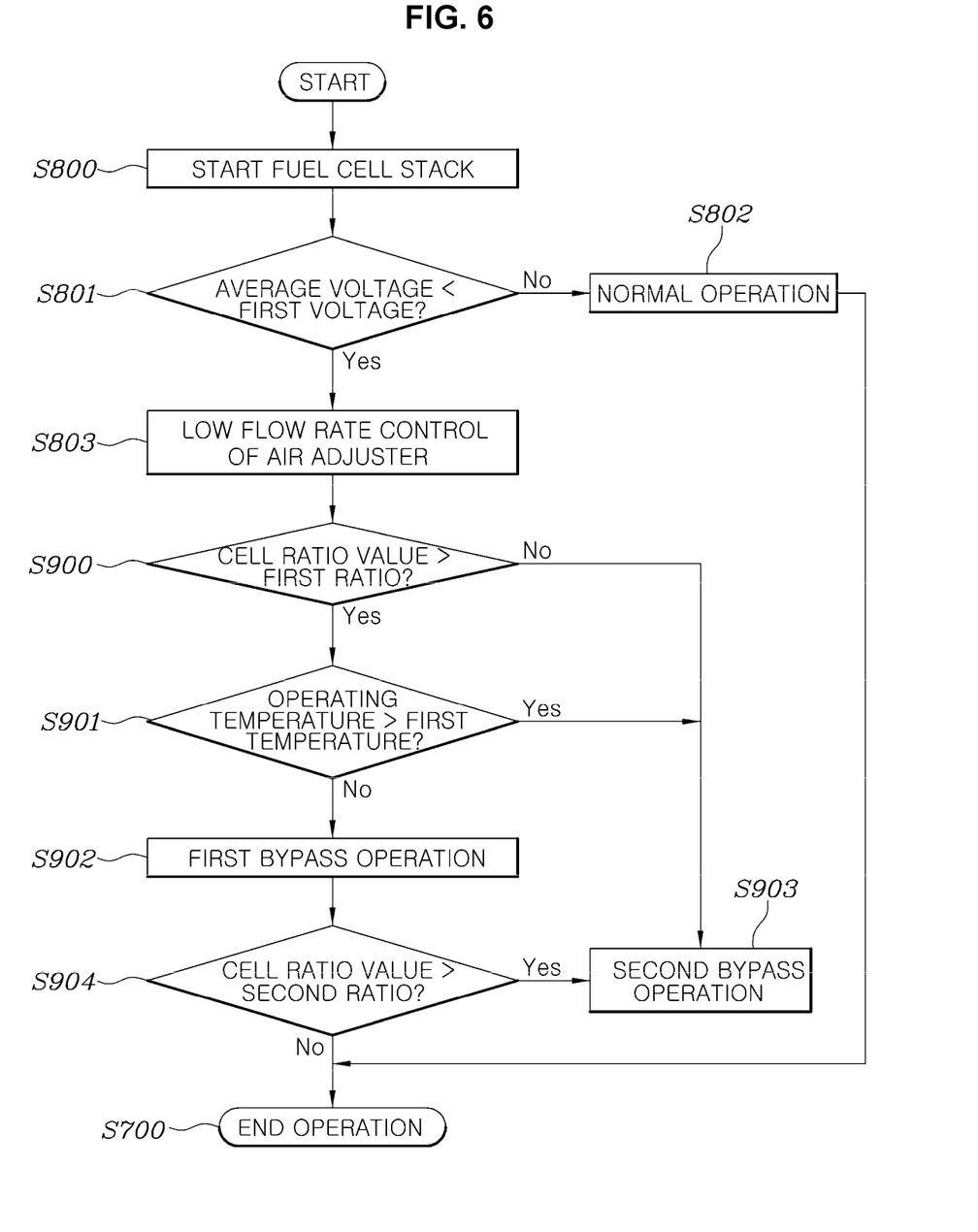

FIGS. 1 to 3 are configuration views a fuel cell operating system according to an embodiment of the present disclosure, FIG. 4 is a graph illustrating a mechanism of the fuel cell operating system according to the embodiment of the present disclosure, and FIGS. 5 and 6 are flowcharts illustrating an application of a method of controlling an operation of a fuel cell according to another embodiment of the present disclosure.

FIG. 1 is a configuration view of the fuel cell operating system according to the embodiment of the present disclosure. A control unit C controls an operation of an air adjuster A, an operation of an air compressor AC, and operations of valves of first and second bypasses $B_1$, $B_2$ disposed on bypass lines. The air adjuster A adjusts the supply amount of oxidation gas supplied to a fuel cell stack F. The air compressor AC compresses the oxidation gas to be supplied to the fuel cell stack and supplies the compressed air to a fuel cell inlet. The first bypass $B_1$ disposed on the bypass line resupplies the oxidation gas, discharged from the fuel cell stack, to the fuel cell inlet. The second bypass $B_2$ disposed on the bypass line resupplies the oxidation gas, discharged from the fuel cell stack F, to a front end of the air compressor AC. The operations of valves are controlled to resupply the oxidation gas to the first and second bypasses. The air adjuster A adjusts the air amount depending on a target air stoichiometry ratio (SR). In a case in which the degradation of the fuel cell stack F is severe, the target air SR of the fuel cell may increase or the air amount may increase.

The control unit C illustrated in FIG. 1 controls the operation of the air adjuster A at a low flow rate depending on an average voltage, which is an average of voltages of the respective fuel cells, and an average current which is an average of currents of the respective fuel cells. Further, at a low flow rate state, the control unit C controls the valves on the bypass lines $B_1$, $B_2$ depending on a cell ratio value which is a ratio of the fuel cells each being applied with a voltage lower than a first voltage among the fuel cells, thereby controlling a flow rate of the oxidation gas to be supplied to the fuel cell stack F. That is, in the embodiment of the present disclosure, the air is controlled at a low flow rate in order to reduce energy unnecessarily generated at an upper voltage limit or an upper current limit and minimize the amount of crossover oxygen. Further, the embodiment of the present disclosure detects a voltage deviation between the respective fuel cells generated when water discharge performance at an air side in a low flow rate state deteriorates, and controls the valves on the bypass lines, thereby increasing the flow rate of the oxidation gas to be supplied to the fuel cell stack.

In the fuel cell operating system according to the embodiment of the present disclosure, the average voltage and the average current state are indicators that indicate whether the low flow rate state is required in accordance with the performance degradation of the entire fuel cell. That is, the average voltage and the average current indicate whether the upper limit control is required as an output of the fuel cell, which is outputted depending on the voltages of the respective fuel cells and the currents of the respective fuel cells, decreases. In particular, a deterioration in performance of the fuel cell accelerates as the time for which the fuel cell is exposed to a high voltage increases. Therefore, the fuel cell operating system according to the embodiment of the present disclosure may provide air in conjunction with the upper voltage limit control or the upper current limit control by adjusting the air amount or the air SR in accordance with a degree to which the performance is degraded.

Therefore, the technology of the upper voltage limit control or the upper current limit control may be applied to the fuel cell. In this case, the fuel cell may become dry unless the air amount decreases. In addition, the large air amount increases the amount of oxygen crossing over the hydrogen side, which degrades durability of the fuel cell. Therefore, the fuel cell operating system according to the embodiment of the present disclosure performs the low flow rate control by means of the air adjuster.

Further, the control unit illustrated in FIG. 1 controls the valve on the bypass line depending on the cell ratio value which is a ratio of the fuel cells each being applied with a voltage lower than the first voltage among the fuel cells. This control may be performed by resupplying the oxidation gas by allowing the oxidation gas to pass through at least any one of the first and second bypasses disposed on the bypass lines.

In this case, the cell ratio value reflects a voltage deviation between the fuel cells in the fuel cell stack F. That is, the cell ratio value may be a criterion depending on which the fuel cell being applied with a voltage lower than the first voltage is determined as a fuel cell that cannot temporarily make a predetermined output. This configuration is distinguished from a case in which the performance of the entire fuel cell stack is simply degraded, i.e., a case in which the entire fuel cell cannot make an output having a predetermined voltage or higher or a predetermined current or higher. That is, the cell ratio value does not reflect a state in which the performance of the fuel cell is degraded, but reflects a state in which the supply of fuel to the fuel cell is instantaneously decreased as the water discharge performance at the air side decreases or the back-diffusion of hydrogen at the hydrogen side increases.

With the above-mentioned configuration, the fuel cell operating system according to the embodiment of the present disclosure solves the problems that occur in the low flow rate state by determining that the supply of air is too insufficient in the low flow rate state and controlling the valve on the bypass line. Therefore, the embodiment of the present disclosure improves stability and durability of the fuel cell stack. In addition, the air supplied in the low flow rate state is used to purge hydrogen, thereby improving a hydrogen concentration. Further, the embodiment may contribute to the miniaturization of the air compressor and the adjustment of the opening/closing degree of a pressure adjusting valve (to be described below) at the air outlet side.

FIGS. 2 and 3 are views illustrating in detail a configuration view of the fuel cell operating system according to the embodiment of the present disclosure. The fuel cell operating system may further include a humidifier H and the pressure adjusting valve V. The humidifier H is a humidity adjusting device for preventing the fuel cell from becoming dry. The humidifier H may be positioned in a state before the air compressed by the air compressor AC is introduced into the fuel cell stack F. The pressure adjusting valve V is mounted in a tube at an outlet side of an air electrode of the fuel cell and controls an air electrode outlet pressure. The pressure adjusting valve V is used to purge the hydrogen by using a differential pressure from a tube at an outlet side of a hydrogen electrode. Further, like the air adjuster A, the pressure adjusting valve may also be used to adjust the air supply amount.

FIGS. 2 and 3 are configuration views of the fuel cell operating system according to the embodiment of the present disclosure, and particularly illustrate that the operations of the first and second bypasses $B_1$, $B_2$ disposed on the bypass lines are controlled. The first bypass $B_1$ is a bypass path through which the oxidation gas discharged from the fuel cell stack is resupplied to the fuel cell inlet side. The oxidation gas may be resupplied to the fuel cell inlet side without passing through the air compressor or may be supplied, as a compressed air, to the fuel cell inlet side by a recirculation blower. In this case, the flow rate of bypass air is increased, which is more advantageous in discharge the produced water. The second bypass $B_2$ is a bypass path through which the oxidation gas discharged from the fuel cell stack is resupplied to the front end of the air compressor. The oxidation gas may be resupplied to the fuel cell inlet side while passing through the air compressor, and a rotational speed of the air compressor may be adjusted to further compress the bypass air. The latter is also more advantageous in discharging the produced water.

FIG. 4 is a graph illustrating a mechanism of the fuel cell operating system according to the embodiment of the present disclosure. The air SR control illustrated in FIG. 4 is control for supplying the air by a predetermined multiple of the target air SR and is distinguished from the low flow rate control that keeps the air amount small in accordance with current-based control to voltage-based control. In general, as shown in the left graph, the low flow rate control is the current-based control and performed when the current is equal to or lower than a predetermined current. However, the control cannot appropriately reflect a durable state of the fuel cell. This is because the low flow rate control is consistently performed even in a case in which the durable state of the fuel cell is closer to the end of life (EOL) than the birth of life (BOL). Because the output of the fuel cell decreases as the durable state of the fuel cell is closer to the EOL, a lower stack voltage is inevitably generated even though the same current is outputted. In this case, the current-based control may cause a rapid decrease in air amount that was pointed out in the related art. Therefore, the fuel cell operating system according to the embodiment of the present disclosure may detect and determine this state and convert this state into the voltage-based control as shown in the right graph. Therefore, the fuel cell operating system according to the embodiment of the present disclosure may maintain the air SR control without performing the low flow rate control, thereby preventing flooding or back-diffusion at the hydrogen side caused by a decrease in water discharge amount by the low flow rate control.

FIGS. 5 and 6 are flowcharts illustrating an application of a method of controlling an operation of a fuel cell according to another embodiment of the present disclosure. In particular, FIG. 5 illustrates the current-based control, and FIG. 6 illustrates the voltage-based control. That is, in the embodiment of the present disclosure, in blocks S100, S200, S302 and S300 the current-based control performs the low flow rate control by means of the air adjuster when the average current is lower than a first current, and in blocks S100, S202, S302, S300 the voltage-based control performs the low flow rate control by means of the air adjuster when the average voltage is lower than a first voltage. The conversion of the current-based control illustrated in FIG. 5 and the voltage-based control illustrated in FIG. 6 has been described in the embodiment illustrated in FIG. 4. Further, in blocks S400, S500, S600, S602 and S700 the valves on the bypass lines may be controlled to supply the oxidation gas to the first or second bypass disposed on the bypass line depending on the cell ratio value. Alternatively, the valve on the bypass line may be controlled to supply the discharged oxidation gas to an air discharge line (not illustrated) instead of controlling the valve of the second bypass.

Meanwhile, FIG. 6 illustrates that the valve on the bypass line is controlled depending on an operating temperature of the fuel cell. As illustrated in FIG. 6, in blocks S800, S801, S802, S803, S900, S901, and S902, when the cell ratio value is equal to or larger than a first ratio and the operating temperature is equal to or higher than a first temperature, the valve on the bypass line may be controlled to supply the oxidation gas to the first bypass. On the contrary, in blocks S903 and S904 in a case in which the cell ratio value is equal to or larger than a second ratio even after the valve of the first bypass is controlled, the valve on the bypass line may be controlled to supply the oxidation gas to the second bypass or instead, supply the discharged oxidation gas to the air discharge line (not illustrated). In this case, the method of controlling the operation of the fuel cell according to the embodiment of the present disclosure may detect that the voltage deviation between the fuel cells becomes severer when the low flow rate state, as a high operating temperature state, is consistently maintained, thereby preventing the deterioration in durability of the fuel cell and stably managing the operation of the fuel cell stack.

While the specific embodiments of the present disclosure have been illustrated and described above, it will be obvious to those skilled in the art that the present disclosure may be variously modified and changed without departing from the technical spirit of the present disclosure defined in the appended claims.

The invention claimed is:

1. A fuel cell operating system comprising:
    an air compressor disposed on an air supply line and configured to compress an oxidation gas to be supplied to a fuel cell stack including an n number of fuel cells, and to supply the oxidation gas to a fuel cell inlet side;
    an air discharge line configured to discharge the oxidation gas from the fuel cell stack;
    a bypass line configured to branch off from the air discharge line through a valve connected to the air supply line, and configured to resupply the discharged oxidation gas to the fuel cell inlet side;
    a control unit configured to control a flow rate of the oxidation gas to be supplied to the fuel cell stack by controlling the valve on the bypass line depending on a cell ratio value;
    a humidifier positioned on the air discharge line; and
    wherein the bypass line is branched off from the air discharge line before passing through the humidifier to bypass the humidifier.

2. The fuel cell operating system of claim 1, wherein the bypass line further comprises a recirculation blower configured to compress the oxidation gas to be resupplied to the fuel cell inlet side.

3. The fuel cell operating system of claim 1, wherein the control unit controls the valve on the bypass line to resupply the discharged oxidation gas to the fuel cell inlet side when the cell ratio value is equal to or larger than a first ratio, and the control unit controls the valve on the bypass line to supply the discharged oxidation gas to the air discharge line when the cell ratio value is smaller than the first ratio and equal to or larger than a second ratio which is smaller than the first ratio.

4. The fuel cell operating system of claim 1, wherein the air supply line further comprises an air adjuster configured to adjust the supply amount of oxidation gas to be supplied to the fuel cell stack, and the control unit controls an operation of the air adjuster at a low flow rate depending on an average voltage when the cell ratio value is equal to or larger than the first ratio and controls the operation of the air adjuster at a low flow rate depending on an average current when the cell ratio value is smaller than the first ratio.

5. The fuel cell operating system of claim 1, wherein the control unit controls the valve on the bypass line depending on an operating temperature of the fuel cell and the cell ratio value which is a ratio of the fuel cells each being applied with a voltage lower than the first voltage among the fuel cells.

6. The fuel cell operating system of claim 2, wherein the control unit controls the valve on the bypass line to resupply the discharged oxidation gas to the fuel cell inlet side when the cell ratio value is equal to or larger than a first ratio and an operating temperature of the fuel cell is lower than a first temperature, and the control unit controls the valve on the bypass line to supply the discharged oxidation gas to the air discharge line when the cell ratio value is equal to or larger than the first ratio and the operating temperature of the fuel cell is equal to or higher than the first temperature or when the cell ratio value is smaller than the first ratio.

7. The fuel cell operating system of claim 1, wherein the air compressor operates for a predetermined time after the valve on the bypass line is controlled to resupply the discharged oxidation gas to the fuel cell inlet side.

8. The fuel cell operating system of claim 1, wherein the first voltage decreases in conjunction with an increase in a parameter which is accumulated as the fuel cell is used.

9. The fuel cell operating system of claim 8, wherein the parameter is the first ratio.

* * * * *